United States Patent
Kanneath Abraham et al.

(10) Patent No.: US 12,328,783 B2
(45) Date of Patent: Jun. 10, 2025

(54) CONNECTION CONTROL FOR MUSIM DEVICES

(71) Applicant: Nokia Technologies Oy, Espoo (FI)

(72) Inventors: Aby Kanneath Abraham, Muvattupuzha (IN); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 306 days.

(21) Appl. No.: 17/793,562

(22) PCT Filed: Dec. 30, 2020

(86) PCT No.: PCT/EP2020/088019
§ 371 (c)(1),
(2) Date: Jul. 18, 2022

(87) PCT Pub. No.: WO2021/148230
PCT Pub. Date: Jul. 29, 2021

(65) Prior Publication Data
US 2023/0057503 A1    Feb. 23, 2023

(30) Foreign Application Priority Data
Jan. 22, 2020  (IN) .............................. 202041002788

(51) Int. Cl.
*H04W 48/06* (2009.01)
*H04W 76/18* (2018.01)

(52) U.S. Cl.
CPC .......... *H04W 76/18* (2018.02); *H04W 48/06* (2013.01)

(58) Field of Classification Search
CPC ..... H04W 76/18; H04W 48/06; H04W 48/08; H04W 48/18; H04W 72/04; H04W 72/1263; H04W 74/0833; H04W 24/08; H04W 72/126; H04W 74/083
See application file for complete search history.

(56) References Cited

U.S. PATENT DOCUMENTS

| | | | |
|---|---|---|---|
| 2012/0287851 | A1 | 11/2012 | Lee .............................. 370/328 |
| 2014/0010180 | A1 | 1/2014 | Lee et al. ....................... 370/329 |
| 2015/0098445 | A1 | 4/2015 | Chakravarthy et al. |
| 2021/0168779 | A1* | 6/2021 | Mondal ................. H04L 5/0035 |
| 2021/0360723 | A1* | 11/2021 | Takakura .............. H04W 48/18 |
| 2024/0121702 | A1* | 4/2024 | Adjakple ............. H04W 48/18 |

OTHER PUBLICATIONS

Qualcomm Incorporated, "Overload control by rejecting access attempts", 3GPP TSG RAN WG2 #72bis, R2-110046, Dublin, Ireland, Jan. 17-21, 2011.

* cited by examiner

Primary Examiner — Wei Zhao
(74) Attorney, Agent, or Firm — Barta Jones, PLLC

(57) ABSTRACT

There are provided measures for enabling/realizing efficient connection control for MUSIM devices, which are communication elements or functions involving multiple universal subscriber identity modules. Such measures exemplarily include obtaining a connection rejection and a connection request inhibition time information in response to a connection request for a first universal subscriber identity module, and applying at least part of the connection request inhibition time information for a second universal subscriber identity module for inhibiting (issuance of) a connection request for the second universal subscriber identity module.

13 Claims, 9 Drawing Sheets

CONNECTION CONTROL FOR MUSIM DEVICES

CROSS REFERENCE TO RELATED APPLICATION

This patent application is a U.S. National Stage application of International Patent Application Number PCT/EP2020/088019 filed Dec. 30, 2020, which is hereby incorporated by reference in its entirety, and claims priority to IN 202041002788 filed Jan. 22, 2020.

FIELD

The present disclosure relates to connection control for devices with multiple universal subscriber identity modules (USIMs), referred to as MUSIM devices. More specifically, the present disclosure relates to measures/mechanisms (including methods, apparatuses (i.e. devices, elements and/or functions) and computer program products) for enabling/realizing efficient connection control for MUSIM devices.

BACKGROUND

Basically, the present disclosure addresses connection control in mobile communication systems. As an example, the present disclosure is applicable in a 3GPP-standardized mobile communication system, such as a 5G/NR or a 4G/LTE/eLTE system.

In mobile communication systems, a communication element or function, herein referred to as a device (such as e.g. a UE), is provided with network connectivity/access by a communication network control element or function, herein referred to as a base station (such as e.g. a gNB or eNB), which belongs to a cell on which the device is currently camped on. To this end, the device requests connection establishment from the base station (e.g. by a RRC Setup Request message), and the base station either accepts or rejects the request (e.g. by a RRC Setup message or a RRC Reject message). Hence, connection control is accomplished by way of signaling between the devices and the base stations, e.g. RRC signaling.

Base stations typically have limits on active users and call attempts per second. If a new users cannot be admitted due to these limits, for e.g. during a mass event, the base station rejects the connection request of his/her device. After such rejection, the device may again attempt connection setup by re-/initiating a subsequent connection establishment procedure so that signaling load (e.g. RRC signaling load) will increase, further aggravating network performance, e.g. the 'call attempts per second' KPI.

To prevent this, it is proposed to inhibit the next connection setup attempt by the rejected device for some time. On the one hand, 3GPP specification (3GPP TS 38.331, V15.7.0, cf. section 5.3.15.2) specifies that the base station includes a parameter waitTime in the RRC Reject message to the device, and the device, upon reception thereof, starts timer T302 with a timer value corresponding to waitTime (which can be up to 16 seconds) so as to delay RRC setup repetitions by the RRC of the device until lapse of the timer T302. On the other hand, e.g. for mMTC control, 3GPP specification (3GPP TS 36.331, V15.7.0, cf. section 5.3.3.8) specifies that the base station includes a parameter extendedWaitTime in the RRC Reject message to the device, and the device, upon reception thereof, forwards the extendedWaitTime to its upper layers so as to delay RRC setup repetitions by the upper layers of the device for the extendedWaitTime duration (which can be up to 1800 seconds).

In mobile communication systems, support of MUSIM devices, i.e. devices with multiple universal subscriber identity modules (USIMs), is currently investigated. Namely, it is requested that devices supporting more than one USIM, i.e. more than one subscription of a user, in which the USIMs may be from the same operator or from different operators, shall be specified by 3GPP specification.

In view of network connectivity/access, it is for example found that totally independent cell selection/reselection for different USIMs will waste power and may extend the cell selection/reselection time for a MUSIM device, especially a MUSIM device implementation which uses common radio and baseband components which are shared among the multiple USIMs. If two different USIMs belong to the same operator, some coordination would be conceivable, e.g. the cell selection and reselection of the secondary USIM could follow the cell selection and reselection of the primary USIM. Thereby, a scenario could easily occur, in which the primary and secondary USIMs are camped on the same cell such that the same base station provides for network connectivity/access for the two USIMs or their subscriptions.

When two USIMs belonging to the same operator are involved in one MUSIM device, it is highly likely that they camp on the same cell, e.g. due to the aforementioned approach of following cell selection and reselection. In such scenario, the above-described proposal for inhibiting the next connection setup attempt by the rejected device however fails. In a MUSIM device implementation which uses separate radio and baseband components, the multiple USIMs can (continue to) initiate connection establishment procedures independently. In a MUSIM device implementation which uses common radio and baseband components, when the connection request by one of the USIMs is rejected, the remaining USIM or USIMs can immediately re-/initiate a subsequent connection establishment procedure. This will further increase the signaling load, especially for/to a base station of a cell when both or all USIMs are camped on this cell; all the more, as the subsequent connection establishment procedures from the remaining USIM or USIMs will most likely result in rejection as well.

Therefore, there is a desire for measures/mechanisms for (enabling/realizing) efficient connection control for MUSIM devices, facilitating reduction in signaling for connection control (e.g. RRC signaling load).

SUMMARY

Various exemplifying embodiments of the present disclosure aim at addressing at least part of the above issues and/or problems and drawbacks.

Various aspects of exemplifying embodiments of the present disclosure are set out in the appended claims.

The scope of protection sought for various embodiments of the invention is set out by the independent claims. The embodiments and/or examples and features, if any, described in this specification that do not fall under the scope of the independent claims are to be interpreted as examples useful for understanding various embodiments of the invention.

According to an example aspect of the present disclosure, there is provided a method comprising obtaining a connection rejection and a connection request inhibition time information in response to a connection request for a first universal subscriber identity module, and applying at least part of the connection request inhibition time information for a second universal subscriber identity module for inhibiting a connection request for the second universal subscriber identity module.

According to an example aspect of the present disclosure, there is provided an apparatus comprising at least one processor and at least one memory including a computer program code, wherein the at least one memory and the computer program code are configured, with the at least one processor, to cause the apparatus to perform at least the following: obtaining a connection rejection and a connection request inhibition time information in response to a connection request for a first universal subscriber identity module, and applying at least part of the connection request inhibition time information for a second universal subscriber identity module for inhibiting a connection request for the second universal subscriber identity module According to an example aspect of the present disclosure, there is provided an apparatus comprising means for obtaining a connection rejection and a connection request inhibition time information in response to a connection request for a first universal subscriber identity module, and means for applying at least part of the connection request inhibition time information for a second universal subscriber identity module for inhibiting a connection request for the second universal subscriber identity module.

According to various developments/modifications, any one of the aforementioned method-related and/or apparatus-related example aspects of the present disclosure may include one or more of the following features:

applying at least part of the connection request inhibition time information for the first universal subscriber identity module for inhibiting a connection request for the first universal subscriber identity module, the connection request inhibition time information may comprise a wait time, and applying the connection request inhibition time information may comprise starting a timer with a timer value corresponding to the wait time and inhibiting a connection request while the timer is running, the connection request inhibition time information may comprise an extended wait time, and applying the connection request inhibition time information may comprise associating the extended wait time with one or more upper layers for inhibiting a connection request for a time corresponding to the extended wait time by the one or more upper layers, in applying the connection request inhibition time information for a universal subscriber identity module, the extended wait time may be associated with the one or more upper layers of said universal subscriber identity module if said universal subscriber identity module supports delay tolerant access, applying the connection request inhibition time information may comprise selectively using the connection request inhibition time information for at least one of a specified condition and a specified connection type, checking applicability of the connection request inhibition time information for the second universal subscriber identity module on the basis of applicability information designating applicability of connection request inhibition time information for one or more universal subscriber identity modules, including the first and second universal subscriber identity modules, and applying the connection request inhibition time information or part thereof, which is applicable for the second universal subscriber identity module, for the second universal subscriber identity module, obtaining applicability information designating applicability of at least part of the obtained connection request inhibition time information for one or more universal subscriber identity modules, including the first and second universal subscriber identity modules, applicability information may be obtained in a radio resource control message and/or a non-access stratum message from a communication network control element or function, to which the connection request for the first universal subscriber identity module was issued, or to which the second universal subscriber identity module is connected, applicability information may comprise an applicability designation for a wait time in the connection request inhibition time information for the second universal subscriber identity module, applicability information may comprise an applicability designation for an extended wait time in the connection request inhibition time information for the second universal subscriber identity module, the applicability designation for the wait time may comprise an information element which, when present in the connection request inhibition time information and/or set to true, designates that the wait time is disabled for other universal subscriber identity modules apart from the first universal subscriber identity module, applicability designation for the extended wait time may comprise an information element which, when present in the connection request inhibition time information and/or set to true, designates that the extended wait time is disabled for other universal subscriber identity modules apart from the first universal subscriber identity module, wait time may be represented by a waitTime parameter in accordance with radio resource control protocol specification, extended wait time may be represented by an extended Wait Time parameter in accordance with radio resource control protocol specification, the connection rejection and/or the connection request inhibition time information may be included in a radio resource control message, which indicates rejection of the connection request for the first universal subscriber identity module, from a communication network control element or function, to which the connection request for the first universal subscriber identity module was issued, the connection request inhibition time information may be derived for the first universal subscriber identity module under a predefined condition, such as after a predefined number of connection rejections, and at least part of the derived connection request inhibition time is applied for the second universal subscriber identity module, the connection request inhibition time information may be derived for the second universal subscriber identity module under a predefined condition, such as upon an indication based on the derivation for the first universal subscriber identity module, and at least part of the derived connection request inhibition time is applied for the second universal subscriber identity module, any operation, including at least the obtaining and the applying, may be performed at or by a connection control instance, such as a radio resource control instance, of a respective universal subscriber identity module, associating at least part of the connection request inhibition time information, which is obtained at or by a connection control instance of the first universal subscriber identity module with a connection control instance of the second universal subscriber identity module, a universal subscriber identity module may comprise a physical or virtual module defining a subscription of a communication element or function in a communication network of a network operator, the first and second universal subscriber identity modules may define subscriptions in a same communication network of a same network operator, the first and second universal subscriber identity modules may be camped on a same cell of a communication network of a network operator, the technique may be operable as, at or by a communication element or function which involves multiple universal subscriber identity modules, including the first and second universal subscriber identity module, a connection control instance of a universal subscriber identity module may comprise a radio resource control instance of said universal subscriber identity module.

According to an example aspect of the present disclosure, there is provided a computer program product comprising (computer-executable) computer program code which, when the program code is executed (or run) on a computer or the program is run on a computer (e.g. a computer of an apparatus according to any one of the aforementioned apparatus-related example aspects of the present disclosure), is configured to cause the computer to carry out the method according to the aforementioned method-related example aspect of the present disclosure.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present disclosure are set out in the following.

By way of exemplifying embodiments of the present disclosure, efficient connection control for MUSIM devices, facilitating reduction in signaling for connection control (e.g. RRC signaling load), can be enabled/realized.

BRIEF DESCRIPTION OF THE DRAWINGS

In the following, the present disclosure will be described in greater detail by way of non-limiting examples with reference to the accompanying drawings, in which.

DETAILED DESCRIPTION

Figure 1:
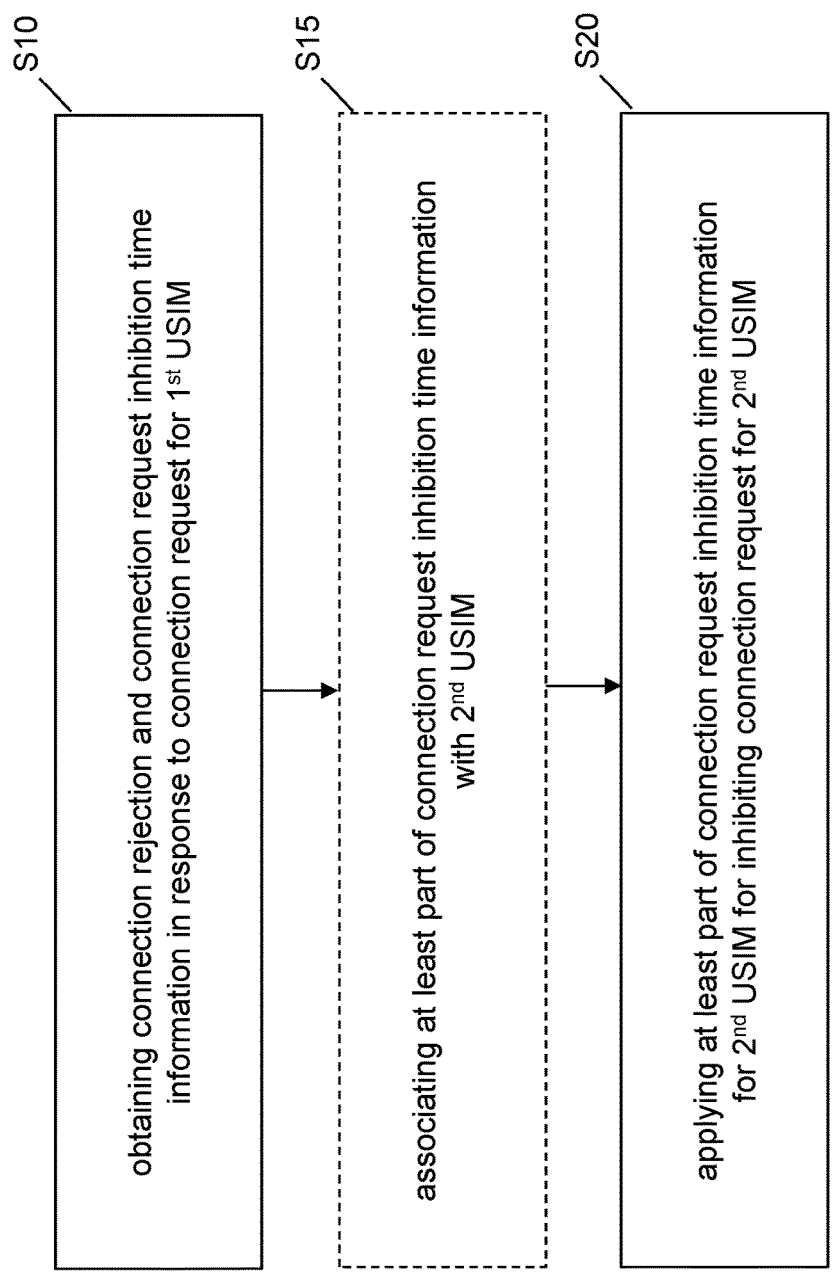
FIG. 1 shows a flowchart illustrating an example of a process according to at least one exemplifying embodiment.

The present disclosure is described herein with reference to particular non-limiting examples and to what are presently considered to be conceivable (examples of) embodiments. A person skilled in the art will appreciate that the present disclosure is by no means limited to these examples and embodiments, and may be more broadly applied.

It is to be noted that the following description mainly refers to specifications being used as non-limiting examples for certain exemplifying network configurations and system deployments. Namely, the following description mainly refers to 3GPP standards, specially referring to 5G/NR standardization as well as 4G/LTE/eLTE standardization, being used as non-limiting examples. As such, the description of exemplifying embodiments given herein specifically refers to terminology which is directly related thereto. Such terminology is only used in the context of the presented non-limiting examples and embodiments, and does naturally not limit the present disclosure in any way. Rather, any other system configuration or deployment may equally be utilized as long as complying with what is described herein and/or exemplifying embodiments described herein are applicable to it.

Hereinafter, various exemplifying embodiments and implementations of the present disclosure and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown. In flowcharts or sequence diagrams, the illustrated order of operations or actions is generally illustrative/exemplifying, and any other order of respective operations or actions is equally conceivable, if feasible.

According to exemplifying embodiments of the present disclosure, in general terms, there are provided measures/mechanisms (including methods, apparatuses (i.e. devices, elements and/or functions) and computer program products) for enabling/realizing efficient connection control for MUSIM devices, which are communication elements or functions involving multiple universal subscriber identity modules.

Herein, a universal subscriber identity module generally comprises a physical or virtual module (including e.g. a physical module such as a U/SIM card, a virtual module such as data and/or functionality representing or constituting a virtual U/SIM, or the like) defining a subscription of a communication element or function in a communication network of a network operator. A MUSIM device generally refers to a communication element or function involving multiple universal subscriber identity modules and thus multiple related subscriptions.

Generally, any reference to a USIM shall herein equally refer to its related subscription, and vice versa. That is, a USIM and its related/associated subscription are synonymously used herein, unless otherwise specified. Accordingly, when it is described herein that in one or more exemplifying embodiments some operation/action is performed by or relating to a USIM, this may equally mean (depending on the circumstances) that this operation/action is performed by or relating to the USIM's related/associated subscription. For example, a cell selection and reselection, a (e.g. RRC) connection establishment, a (e.g. RRC) connection establishment inhibition, or the like can be performed by or relating to a USIM and/or its related/associated subscription.

For the following explanation of exemplifying embodiments, it may be assumed that a MUSIM device involves two USIMs (also referred to as USIM-A and USIM-B) which define subscriptions in a same communication network of a same network operator. More specifically, it may be assumed that the two USIMs (of a MUSIM device), i.e. its two subscriptions, are camped on a same cell of a communication network of a network operator such that a same communication network control element or function provides for network connectivity/access for the two USIMs or their subscriptions. By way of example, such scenario could occur when the secondary USIM (e.g. USIM-B) is configured to follow the primary USIM (e.g. USIM-A) in terms of cell selection and reselection, which is proposed to be beneficial if two USIMs belong to the same operator, especially in a MUSIM device implementation which uses common radio and baseband components which are shared among the multiple USIMs.

While explanations are mainly given for a MUSIM device with two USIMs, it is noted that a MUSIM device may also have more than two USIMs, wherein hereinafter any reference to the second USIM shall apply to all other USIMs apart from the first USIM (for which an initial connection request was issued).

FIG. 1 shows a flowchart illustrating an example of a process according to at least one exemplifying embodiment. The process of FIG. 1 is operable at or by a MUSIM device, such as an UE involving two (or more) USIMs, including a first USIM and a second USIM, corresponding to respective subscriptions.

As shown in FIG. 1, a process (method) according to at least one exemplifying embodiment comprises an operation (S10) of obtaining a connection rejection and a connection request inhibition time information in response to a connection request for a first USIM, and an operation (S20) of applying at least part of the connection request inhibition time information for a second USIM for inhibiting a connection request for the second USIM.

As shown in FIG. 1, a process (method) according to at least one exemplifying embodiment may optionally comprise an operation (S15) of associating at least part of the connection request inhibition time information, which is obtained for the first USIM, with a the second USIM. As described below, such associating operation may be understood to be a logical or virtual operation, basically meaning that at least part of the connection request inhibition time information, which is originally (intended/applicable) for the first USIM, may be allocated, assigned, enabled, used, etc. for the second USIM.

Although not shown in FIG. 1, a process (method) according to at least one exemplifying embodiment may optionally comprise an operation of applying at least part of the connection request inhibition time information for the first USIM for inhibiting a connection request for the first USIM, as is described below e.g. in connection with operation S240 of FIG. 2. Additionally or alternatively, a process (method) according to at least one exemplifying embodiment may optionally comprise an operation of checking applicability of the connection request inhibition time information for the second universal subscriber identity module on the basis of applicability information designating applicability of connection request inhibition time information for one or more universal subscriber identity modules, including the first and second universal subscriber identity modules, and an operation of applying the connection request inhibition time information or part thereof, which is applicable for the second universal subscriber identity module, for the second universal subscriber identity module, as is described below e.g. in connection with operations S3130 and S3150 of FIG. 4 and operations S3240 and S3250 of FIG. 5. In this regard, a process (method) according to at least one exemplifying embodiment may optionally comprise an operation of obtaining applicability information designating applicability of at least part of the obtained connection request inhibition time information for one or more universal subscriber identity modules, including the first and second universal subscriber identity modules, as is described below e.g. in connection with operation S3110 of FIG. 4 and operation S3210 of FIG. 5

Hereinafter, an exemplary/illustrative mode according to exemplifying embodiments of the present disclosure is explained.

In this exemplary/illustrative mode, it is assumed that any operation, including at least the aforementioned obtaining and applying operations, is performed at or by a connection control instance, such as a radio resource control (RRC) instance, of a respective USIM. In this regard, a USIM or its connection control instance, e.g. RRC instance, is meant or understood as a logical or virtual instance, which is related to the USIM, namely for handling operations or the like for the USIM.

Accordingly, reference is hereinafter exemplarily/illustratively made to a connection control instance, e.g. RRC instance, of the 1$^{st}$ USIM and a connection control instance, e.g. RRC instance, of the 2$^{nd}$ USIM. Yet, it is to be understood that both connection control instances, e.g. RRC instances, of the two (or more) USIMs of a MUSIM device can be implemented by a single processing element such as a processor, without requiring dedicated or distinct processing threads, areas, resource, or the like. In view thereof, whenever reference is made to a connection control instance, e.g. RRC instance, this does not mean a specific actual or physical entity, and, whenever reference is made to sort of messaging/communication between two connection control instances, e.g. RRC instances, this is meant or understood as logical or virtual and does not require any actual or physical messages or exchange between different parts of a processing element such as a processor. That is, such logical or virtual messaging/communication, which may represent an example of the aforementioned (optional) associating operation, may not be required and, whenever mentioned for the sake of explanation/understanding, is usually denoted as forwarding or associating. Similar notions equally apply to upper layer instances, where applicable.

It is to be noted that all explanations, including all features, effects, etc., as described below in the context of the exemplary/illustrative mode according to exemplifying embodiments of the present disclosure, equally hold and apply (in a more general form) for the process (method) of FIG. 1. That is, even if some operation is described below with relation to some connection control instance, e.g. RRC instance, of a USIM, this operation is deemed to be generally disclosed, i.e. without any relation to a connection control instance, e.g. RRC instance, but merely with regard to the respective USIM (in a logical or virtual manner).

Figure 2:
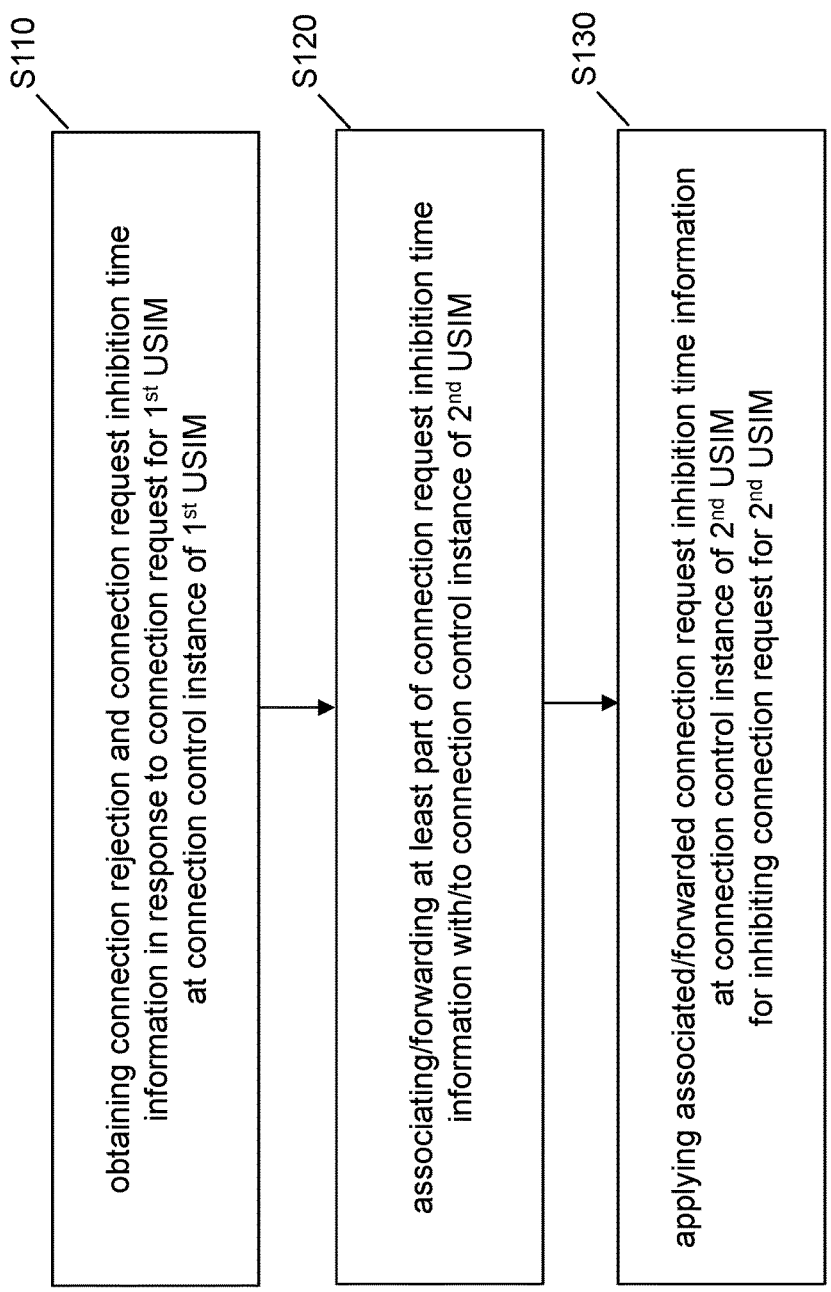
FIG. 2 shows a flowchart illustrating a first example of an exemplary/illustrative mode of a process according to at least one exemplifying embodiment.

FIG. 2 shows a flowchart illustrating a first example of an exemplary/illustrative mode of a process (method) according to at least one exemplifying embodiment. The process of FIG. 1 is operable at or by a MUSIM device, such as an UE involving two (or more) USIMs, including a first USIM and a second USIM, corresponding to respective subscriptions.

As shown in FIG. 2, a process (method) according to at least one exemplifying embodiment comprises an operation (S110) of obtaining a connection rejection (or, stated in other words, a connection establishment rejection indication or message) and a connection request inhibition time information in response to a connection request (or, stated in other words, a connection establishment request indication or message) for the first USIM at a connection control instance of the first USIM, an operation (S120) of associating/forwarding at least part of the connection request inhibition time information with/to a connection control instance of the second USIM, and an operation (S130) of applying the associated/forwarded connection request inhibition time information at the connection control instance of the second USIM for inhibiting a connection request for the second USIM, such as e.g. generation, issuance, transmission, etc. of a connection request for the second USIM. Accordingly, the connection request inhibition time information, which is provided for (with respect to) the first USIM, is used for (with respect to) the second USIM.

For example, a RRC instance of the first USIM may receive/obtain a RRC Reject message from an e/gNB in response to a RRC Setup Request message to the e/gNB, wherein the RRC Reject message includes or represents an indication of connection establishment rejection and includes the connection request inhibition time information. The connection request inhibition time information may comprise e.g. a waitTime parameter (i.e. a waitTime parameter in accordance with radio resource control protocol specification) representing a wait time (which can be up to 16 seconds) and/or a extendedWaitTime parameter (i.e. an extendedWaitTime parameter in accordance with radio resource control protocol specification) representing an extended wait time (which can be up to 1800 seconds). Then, the RRC instance of the first USIM may associate/forward the waitTime parameter and/or the extendedWaitTime parameter with/to a RRC instance of the second USIM, where the thus associated/forwarded waitTime parameter and/or extendedWaitTime parameter are applied.

For a wait time in the connection request inhibition time information, application at the connection control instance (e.g. the RRC instance) of the second USIM may comprise starting a timer with a timer value corresponding to the wait time at the connection control instance and inhibiting a connection request by the connection control instance, such as e.g. generation, issuance, transmission, etc. of a connection request, while the timer is running. For example, the timer T302 which is specific for the RRC instance of the second USIM may be set based on the waitTime parameter and started, and no connection request by the RRC instance of the second USIM may be generated, issued or transmitted, i.e. no RRC connection establishment attempt may be initiated, during the waitTime duration. For an extended wait time in the connection request inhibition time information, application at the connection control instance (e.g. the RRC instance) of the second USIM may comprise associating/forwarding the extended wait time to one or more upper layer instances for inhibiting a connection request, such as e.g. generation, issuance, transmission, etc. of a connection request, for a time corresponding to the extended wait time by the one or more upper layer instances. For example, the extendedWaitTime parameter may be associated/forwarded with/to the one or more upper layer instances of the second USIM, and no connection request by the one or more upper layer instances of the second USIM may be generated, issued or transmitted, i.e. no RRC connection establishment attempt may be initiated, during the extendedWaitTime duration. For example, the extended wait time may be associated/forwarded by/from the connection control instance (e.g. the RRC instance) of the second USIM with/to the one or more upper layer instances of the second USIM only if the second USIM supports delay tolerant access.

Figure 3:
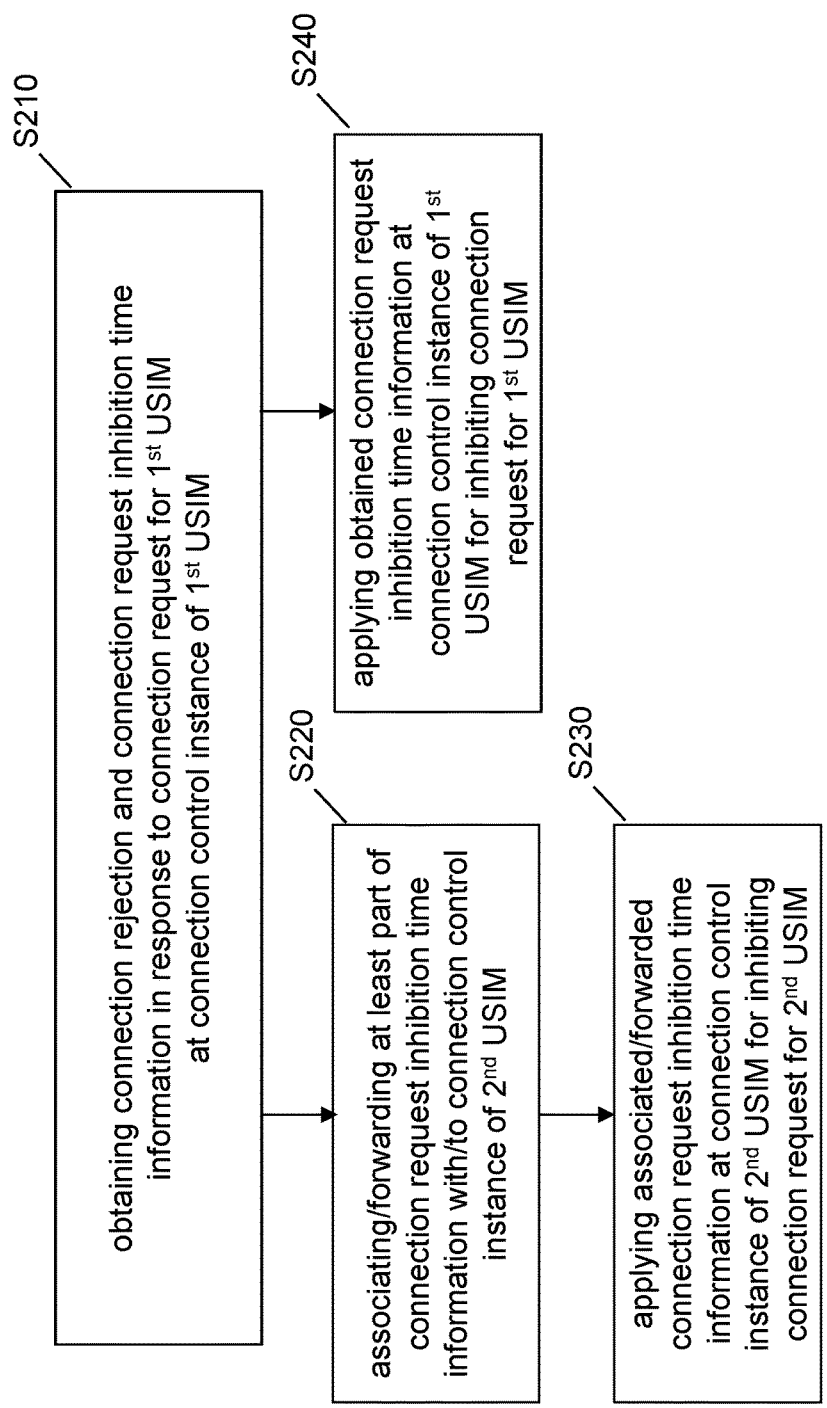
FIG. 3 shows a flowchart illustrating a second example of an exemplary/illustrative mode of a process according to at least one exemplifying embodiment.

FIG. 3 shows a flowchart illustrating a second example of an exemplary/illustrative mode of a process (method) according to at least one exemplifying embodiment. The process of FIG. 3 is operable at or by a MUSIM device, such as an UE involving two (or more) USIMs, including a first USIM and a second USIM, corresponding to respective subscriptions.

As shown in FIG. 3, a process (method) according to at least one exemplifying embodiment comprises operations corresponding to those shown in FIG. 2. Namely, operations S210, S220 and S230 of FIG. 3 correspond to operations S110, S120 and S130 of FIG. 2. Additionally, the process (method) shown in FIG. 3 comprises an operation (S240) of applying the obtained connection request inhibition time information at the connection control instance of the first USIM for inhibiting a connection request for the first USIM, such as e.g. generation, issuance, transmission, etc. of a connection request for the first USIM. Accordingly, the connection request inhibition time information, which is provided for (with respect to) the first USIM, is used for (with respect to) both the first and second USIMs.

For application of the connection request inhibition time information at the connection control instance (e.g. the RRC instance) of the first USIM, similar notions as outlined above for application at the connection control instance (e.g. the RRC instance) of the second USIM equally apply, and reference is made to the above explanation accordingly.

It is noted that the operation S240 is generally independent of the operations S220 and S230, and the operation S240 may thus be performed (at least in part) concurrently with the operations S220 and/or S230, before the operation S220, before or after the operation S240, or at any other timing.

According to at least one exemplifying embodiment, applying the connection request inhibition time information (in any one of operations S130, S230 and S240) may comprise selectively using the connection request inhibition time information for at least one of a specified condition and a specified connection type. That is, the connection request inhibition time information may be applied or not, depending on the circumstances. For example, the connection request inhibition time information, e.g. waitTime and/or extendedWaitTime, may be applied (at the first and/or second USIM) only for mobile originated calls or another particular type of connection, only if the subsequent connection request, which will be inhibited accordingly, is for establishment of a connection, the type of which is the same or has a particular relation to/with the type of connection for which the initial connection request was issued, or the like. As another example, the connection request inhibition time information, e.g. waitTime and/or extendedWaitTime, may be applied (at the first and/or second USIM) only for a particular type of device or a particular device class, or only for particular resources, such as e.g. for some high-priority resources such as slices with guaranteed reliability (based on some pre-configuration). Accordingly, the subsequent connection request may be inhibited only if appropriate, while any other connection request, which is not desired, required or appropriate to be inhibited, may still be generated, issued or transmitted without (undue) delay.

Figure 4:
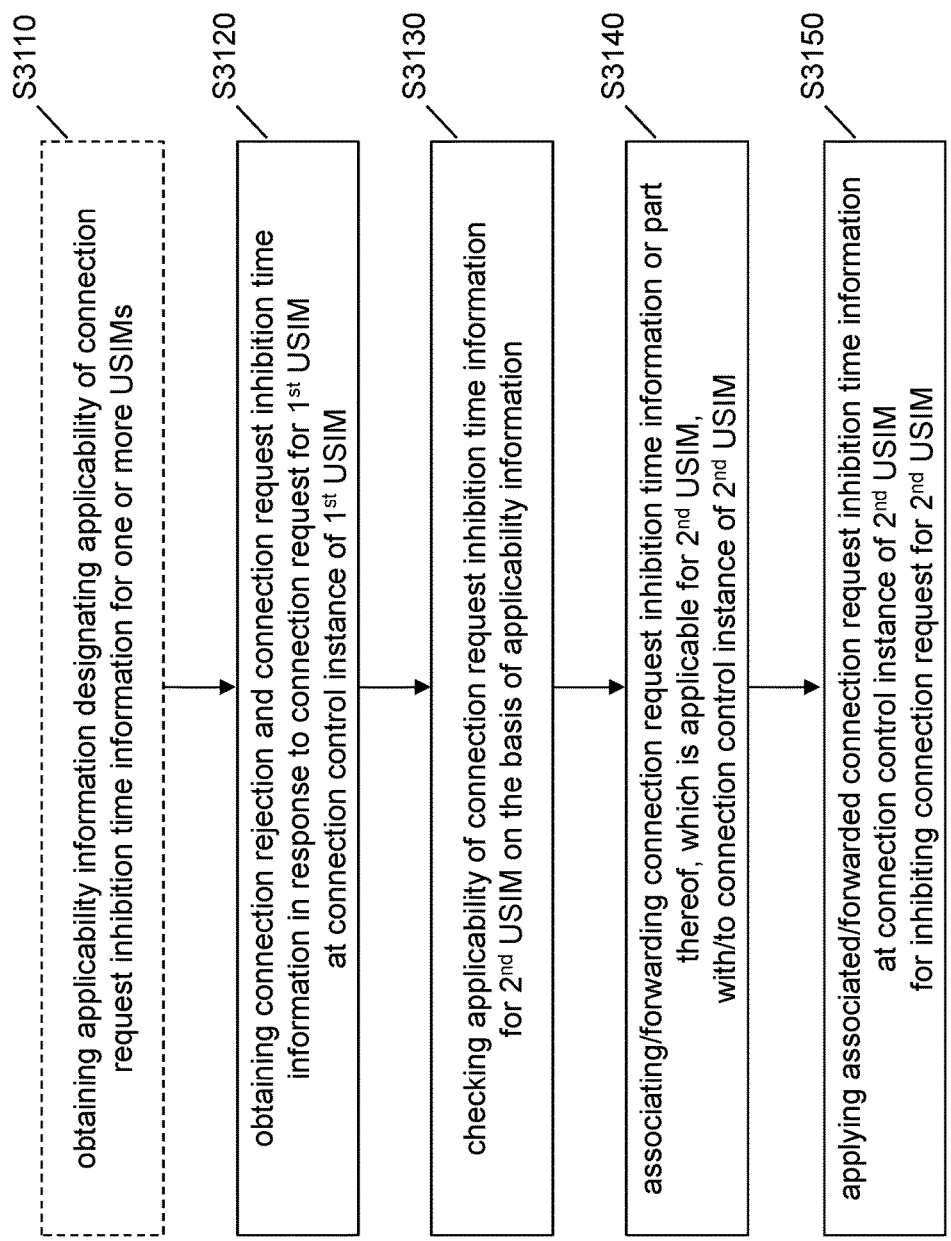
FIG. 4 shows a flowchart illustrating a third example of an exemplary/illustrative mode of a process according to at least one exemplifying embodiment.

FIG. 4 shows a flowchart illustrating a third example of an exemplary/illustrative mode of a process (method) according to at least one exemplifying embodiment. The process of FIG. 4 is operable at or by a MUSIM device, such as an UE involving two (or more) USIMs, including a first USIM and a second USIM, corresponding to respective subscriptions.

As shown in FIG. 4, a process (method) according to at least one exemplifying embodiment comprises operations corresponding to those shown in FIG. 2. Namely, operations S3120 and S3150 of FIG. 4 correspond to operations S110 and S130 of FIG. 2. Additionally, the process (method) shown in FIG. 4 comprises an operation (S3130) of checking applicability of the connection request inhibition time information for the second USIM on the basis of applicability information, wherein the applicability information designate applicability of connection request inhibition time information for one or more USIMs, including the first and second USIMs, and an operation (S3140) of associating/forwarding the obtained connection request inhibition time information or part thereof, which is applicable for the second USIM (as a result of the checking operation), with/to the connection control instance of the second USIM. Accordingly, the connection request inhibition time information, which is provided for (with respect to) the first USIM, is used for (with respect to) the second USIM as far as applicable for the second USIM, in that only the applicable information is associated/forwarded.

As shown in FIG. 4, a process (method) according to at least one exemplifying embodiment may optionally comprise an operation (S3110) of obtaining the applicability information. The applicability information may be obtained in a RRC message and/or a NAS message from an e/gNB to which the connection request for the first USIM was issued, or to which the second USIM is connected. For example, the applicability information may be provided from the e/gNB to the MUSIM device (e.g. the first USIM) during NAS registration procedure, e.g. in Registration Accept message (for the first USIM), or during RRC connection establishment procedure, e.g. in RRC Reject message, or at any other timing. Also, the applicability information may be provided from an e/gNB, to which the second USIM is connected, to the MUSIM device (i.e. the second USIM) in a NAS message, such that it could be received for the second USIM when the applicability is checked based on a NAS message. Thereby, the applicability information may be specifically configured e.g. in view of a current situation. Accordingly, the network, i.e. the communication network control element or function which is in charge of providing network connectivity/access, may exemplarily inform the device, i.e. the communication element or function, whether the connection request inhibition time information, e.g. wait time and/or extended wait time should be applied for multiple USIMs or only for the current USIM in a RRC/NAS message (for e.g. RRC reject message). Also, the applicability information may be obtained by way of pre-/configuration or may be received in any way, e.g. in a system information broadcasted by the network (e.g. the e/gNB). Thereby, the applicability information may be generically configured e.g. in view of the device properties. Generally, the applicability information may be obtained before, after or concurrent with the operation S3120.

For example, an e/gNB may include the applicability information in a RRC Reject message in response to a RRC Setup Request message to the e/gNB. When the connection request inhibition time information (in the RRC Reject message) comprise a wait time (e.g. a waitTime parameter) and an extended wait time (e.g. an extendedWaitTime parameter), the applicability information may comprise an applicability designation for the wait time and/or the extended wait time. By way of example, it may be designated that the wait time is applicable (i.e. shall be applied) for all USIMs, including the first and second USIMs, and the extended wait time is applicable (i.e. shall be applied) for the first USIM only. In this case, the RRC instance of the first USIM may associate/forward the wait time (e.g. the waitTime parameter) with/to the RRC instance of the second USIM, but not the extended wait time (e.g. the extendedWaitTime parameter). Accordingly, the wait time (e.g. the waitTime parameter) may be applied at the RRC instance of the first USIM and the RRC instance of the second USIM, and the extended wait time (e.g. the extendedWaitTime parameter) may be applied at the RRC instance of the first USIM only.

In the example of FIG. 4, the applicability information is obtained or captured/received and processed at the RRC instance of the first USIM. Namely, the applicability check is performed by the RRC of the first USIM, and the RRC instance of the second USIM gets only the applicable (part of the) connection request inhibition time information which may then be applied as a whole. Here, for example, the applicability information may be provided from the e/gNB to the MUSIM device during NAS registration procedure, e.g. in Registration Accept message (for the second USIM), or during RRC connection establishment procedure, e.g. in RRC Reject message, or at any other timing.

Figure 5:
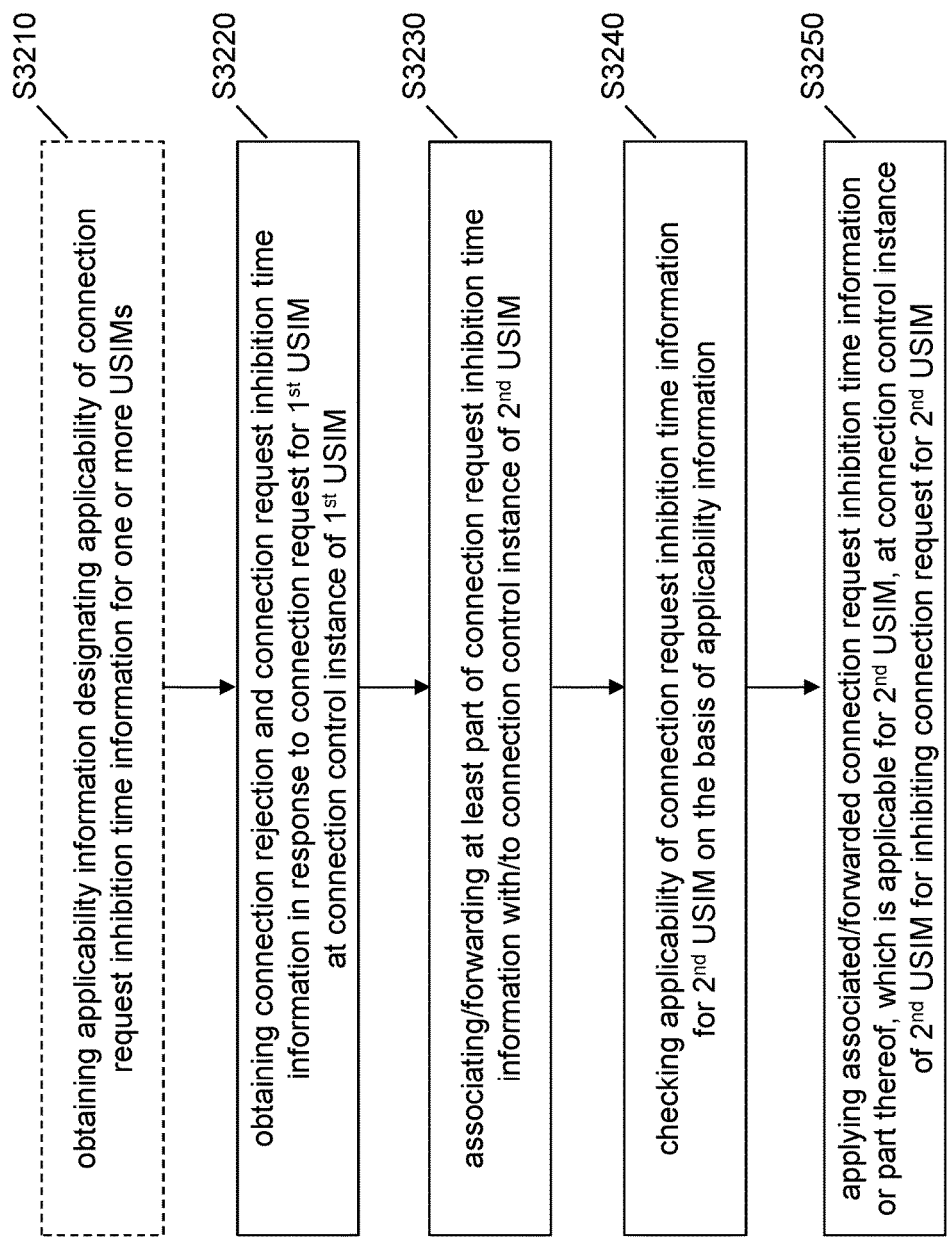
FIG. 5 shows a flowchart illustrating a fourth example of an exemplary/illustrative mode of a process according to at least one exemplifying embodiment.

FIG. 5 shows a flowchart illustrating a fourth example of an exemplary/illustrative mode of a process (method) according to at least one exemplifying embodiment. The process of FIG. 5 is operable at or by a MUSIM device, such as an UE involving two (or more) USIMs, including a first USIM and a second USIM, corresponding to respective subscriptions.

As shown in FIG. 5, a process (method) according to at least one exemplifying embodiment comprises operations corresponding to those shown in FIG. 2. Namely, operations S3220 and S3230 of FIG. 5 correspond to operations S110 and S120 of FIG. 2. Additionally, the process (method) shown in FIG. 5 comprises an operation (S3240) of checking applicability of the connection request inhibition time information for the second USIM on the basis of applicability information, wherein the applicability information designate applicability of connection request inhibition time information for one or more USIMs, including the first and second USIMs, and an operation (S3250) of applying the associated/forwarded connection request inhibition time information or part thereof, which is applicable for the second universal subscriber identity module (as a result of the checking operation), at the connection control instance of the second USIM. Accordingly, the connection request inhibition time information, which is provided for (with respect to) the first USIM, is used for (with respect to) the second USIM as far as applicable for the second USIM, in that only the applicable information is applied.

As shown in FIG. 5, a process (method) according to at least one exemplifying embodiment may optionally comprise an operation (S3210) of obtaining the applicability information. As this operation corresponds to operation S3110 of FIG. 4, reference is made to the above description thereof for details.

For example, an e/gNB may include the applicability information in a RRC Reject message in response to a RRC Setup Request message to the e/gNB. When the connection request inhibition time information (in the RRC Reject message) comprise a wait time (e.g. a waitTime parameter) and an extended wait time (e.g. an extendedWaitTime parameter), the applicability information may comprise an applicability designation for the wait time and/or the extended wait time. By way of example, it may be designated that the wait time is applicable (i.e. shall be applied) for all USIMs, including the first and second USIMs, and the extended wait time is applicable (i.e. shall be applied) for the first USIM only. In this case, the RRC instance of the first USIM may associate/forward both the wait time (e.g. the waitTime parameter) and the extended wait time (e.g. the extendedWaitTime parameter) with/to the RRC instance of the second USIM, then the RRC instance of the second USIM checks the applicability thereof and (as a result thereof) applies the wait time (e.g. the waitTime parameter) but not the extended wait time (e.g. the extendedWaitTime parameter). Accordingly, the wait time (e.g. the waitTime parameter) may be applied at the RRC instance of the first USIM and the RRC instance of the second USIM, and the extended wait time (e.g. the extendedWaitTime parameter) may be applied at the RRC instance of the first USIM.

In the example of FIG. 5, the applicability information is obtained or captured/received and processed at the RRC instance of the second USIM (potentially via the RRC instance of the first USIM). Namely, the applicability check is performed by the RRC of the second USIM, and the RRC instance of the second USIM applies only the applicable (part of the) connection request inhibition time information.

The applicability information may designate the applicability for (parts of) connection request inhibition time information for specific USIMs, e.g. non-/applicability of wait time and/or extended wait time for the first USIM and for the second USIM, or based on particular USIM types, properties or the like, e.g. non-/applicability of wait time and/or extended wait time for a first-type USIM and/or a second-type USIM, wherein in such case the operation S3130 or S3240 comprises a determination of the corresponding types, properties or the like of the multiple USIMs so as to be able to assign the designated applicability designations to the individual USIMs.

Although not shown in FIGS. 4 and 5, the process (method) may additionally comprise an operation such as operation S240 of FIG. 3, which may be performed e.g. before operation S3130 or before, after or concurrent with operation S3150 in the process of FIG. 4, or e.g. before, after or concurrent with operation S3230 in the process of FIG. 5.

Figure 6:
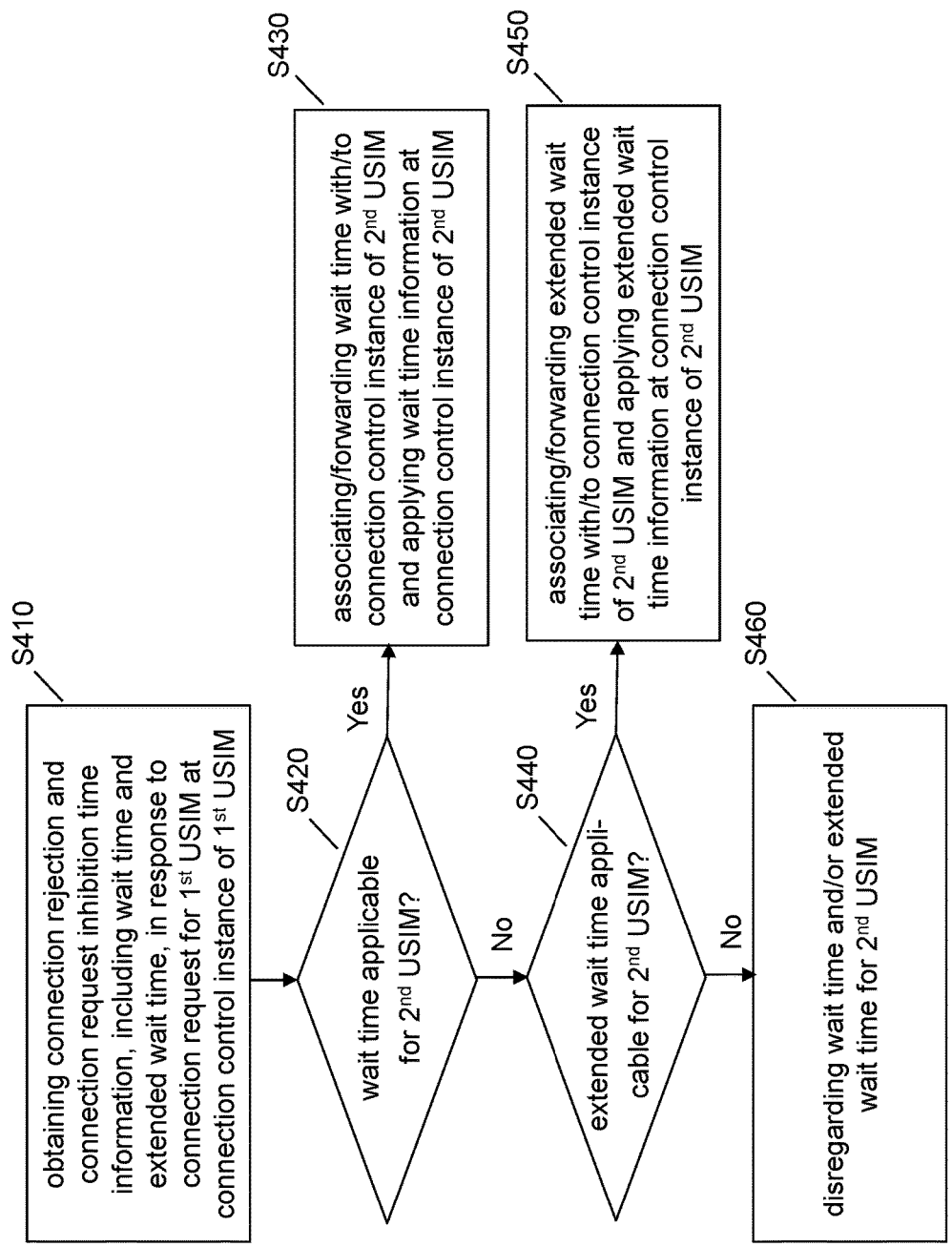
FIG. 6 shows a flowchart illustrating a fifth example of an exemplary/illustrative mode of a process according to at least one exemplifying embodiment.

FIG. 6 shows a flowchart illustrating a fifth example of an exemplary/illustrative mode of a process (method) according to at least one exemplifying embodiment. The process of FIG. 6 is operable at or by a MUSIM device, such as an UE involving two (or more) USIMs, including a first USIM and a second USIM, corresponding to respective subscriptions.

As shown in FIG. 6, a process (method) according to at least one exemplifying embodiment comprises operations corresponding to those shown in FIG. 4. Namely, operation S410 of FIG. 6 corresponds to operation S3120 of FIG. 4, operations S420 and S440 of FIG. 6 correspond to operation S3130 of FIG. 4, and operations S430 and S450 of FIG. 6 correspond to operations S3140 and S3150 of FIG. 4.

For the process (method) of FIG. 6, it is assumed that the applicability information comprises an applicability designation for a wait time in the connection request inhibition time information for the second USIM and/or an applicability designation for an extended wait time in the connection request inhibition time information for the second USIM. Accordingly, these applicability designations may be individually checked, and corresponding operations may be performed based on the individual checking results.

In operation S420, it is checked whether the wait time (e.g. the waitTime parameter) is applicable for the second USIM. Only if applicable, the wait time (e.g. the waitTime parameter), i.e. a (corresponding/applicable) part of the connection request inhibition time information, is associated/forwarded with/to the second USIM, e.g. the RRC instance thereof, and applied for the second USIM in operation S430. In operation S440, it is checked whether the extended wait time (e.g. the extendedWaitTime parameter) is applicable for the second USIM. Only if applicable, the extended wait time (e.g. the extendedWaitTime parameter), i.e. a (corresponding/applicable) part of the connection request inhibition time information, is associated/forwarded with/to the second USIM, e.g. the RRC instance thereof, and applied for the second USIM in operation S450. The wait time and/or the extended wait time, which is/are not applicable for the second USIM, are disregarded for the second USIM in operation S460, i.e. neither associated/forwarded not applied.

Although not shown in FIG. 6, the process (method) may additionally comprise an operation such as operation S240 of FIG. 3.

Despite the exemplary illustration in FIG. 6, the checking operations can be performed in another sequence, such as e.g. vice versa or (at least in part) concurrently, which similarly applies to the remaining operations, especially the associating/forwarding and applying operations.

A part of the connection request inhibition time information, e.g. the wait time and/or the extended wait time, may be determined to be applicable for the second USIM in case of a positive designation or lack of a negative designation of its applicability for the second USIM in the applicability information. For example, the applicability designation for the wait time may comprise an information element which, when present in the connection request inhibition time information and/or set to true, designates that the wait time is disabled for other USIMs apart from the first USIM, e.g. the second USIM, and/or the applicability designation for the extended wait time may comprise an information element which, when present in the connection request inhibition time information and/or set to true, designates that the extended wait time is disabled for other USIMs apart from the first USIM, e.g. the second USIM. In such examples, the missing of a corresponding information element or the presence of a corresponding information element being set to false can be regarded as lack of a negative designation of applicability.

When the aforementioned information element for the wait time is referred to as disableWaitTimeforMUSIM, and the aforementioned information element for the extended wait time is referred to as disableExtendedWaitTimefor-MUSIM, the following logic could apply for corresponding 3GPP specification (e.g. 3GPP TS 38.331, V15.7.0, cf. section 5.3.15.2 and/or 3GPP TS 36.331, V15.7.0, cf. section 5.3.3.8), at least for the case that multiple USIMs (subscriptions) of a MUSIM device are camped on the same cell.

If disable WaitTimeForMUSIM is present and is set to True
   Apply waitTime to current USIM/subscription
Else
   Apply waitTime to all/other USIMs/subscriptions
If disableExtendedWaitTimeForMUSIM is present and is set to True
   Apply extendedWaitTime to current subscription
Else
   Apply extendedWaitTime to all/other USIMs/subscriptions For example, if there is an indication from the network (e.g. e/gNB) not to apply the waitTime and/or extendedWaitTime parameter for other USIMs, e.g. through the information elements disable WaitTimeForMUSIM and/or disableExtendedWaitTimeForMUSIM, the waitTime and/or extendedWaitTime (i.e. corresponding timers or delays) will be applied only for the current USIM, namely the USIM from which the recent/actual connection request was issued, accordingly.

According to exemplifying embodiments, a default behavior in terms of applicability for other USIMs than the current USIM may be established or defined, i.e. configured in advance, for any MUSIM device. Since during RRC connection establishment, the network (e.g. e/gNB) normally does not know about/that a device issues a connection request such as a RRC Setup Request message, such default behavior could efficiently by like "follow the connection request inhibition time information (e.g. wait time and/or extended wait time) for all USIMs".

Figure 7:
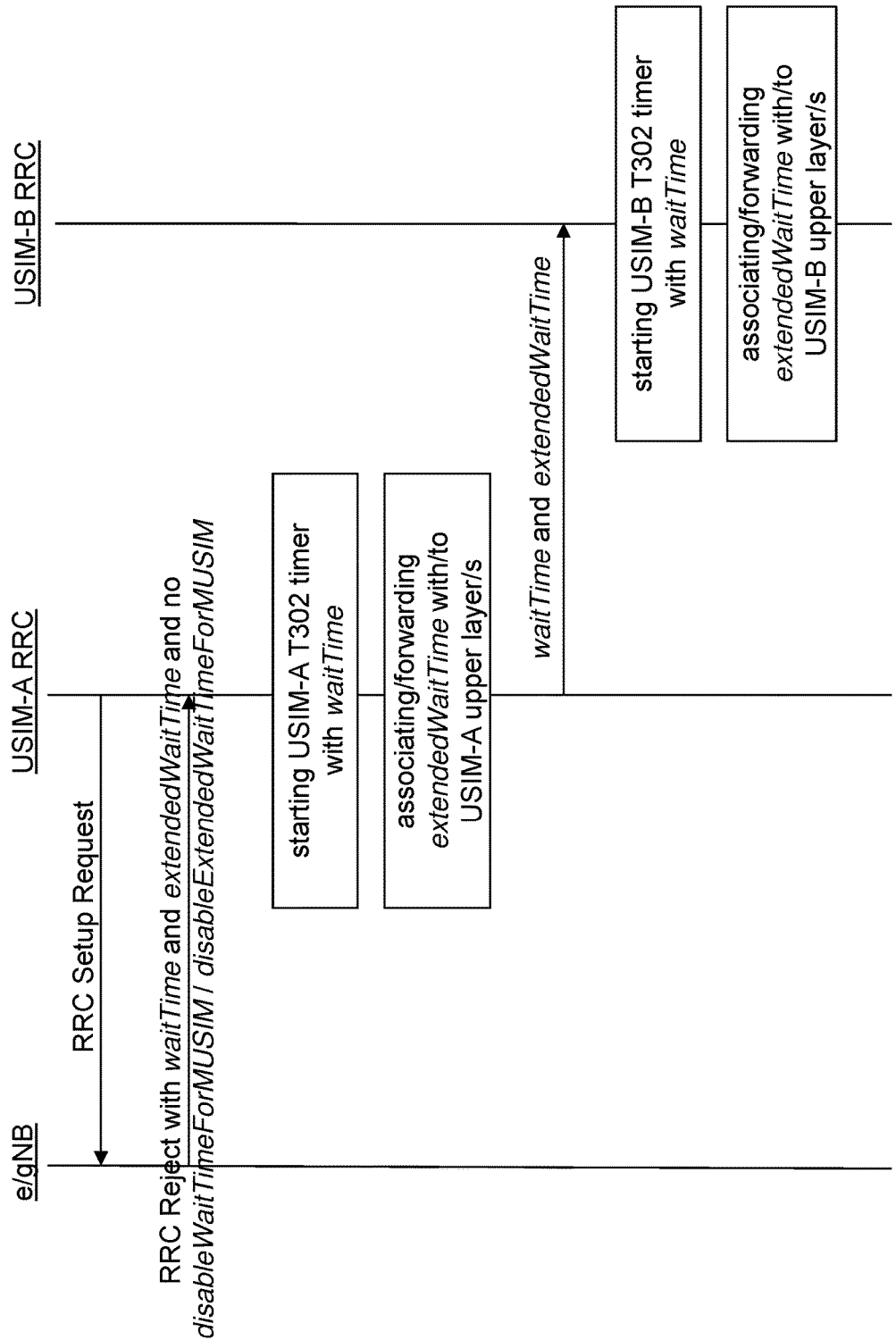
FIG. 7 shows a diagram illustrating an example of a sequence of an exemplary/illustrative mode according to at least one exemplifying embodiment.

FIG. 7 shows a diagram illustrating an example of a sequence (method) of an exemplary/illustrative mode according to at least one exemplifying embodiment, which is illustrated from a system perspective. In FIG. 7, e/gNB represents the base station of the cell on which the MUSIM device, i.e. its USIMs are camped, USIM-A RRC represents a RRC instance (connection control instance) of the first USIM, i.e. USIM-A, and USIM-B RRC represents a RRC instance (connection control instance) of the second USIM, i.e. USIM-B.

As shown in FIG. 7, USIM-A RRC issues a RRC Setup Request message (connection request) for USIM-A. In response thereto, e/gNB issues a RRC Reject message, as the connection request is assumed to be rejected. Together with or in the RRC Reject message, parameters waitTime and extendedWaitTime is provided as connection request inhibition time information, but no information elements disableWaitTimeForMUSIM and disableExtendedWait-TimeForMUSIM are provided. Upon obtaining this, USIM-A RRC starts the timer T302 specific for USIM-A with waitTime, and associates/forwards extendedWaitTime with/to the upper layers of USIM-A (e.g. if USIM-A supports delay tolerant access (since extendedWaitTime need not be associated/forwarded with/to that upper layers of an USIM not supporting delay tolerant access)). Also, USIM-A associates/forwards waitTime and extendedWaitTime with/to USIM-B RRC. This associating/forwarding may be effected as default or without any applicability checking at USIM-A RRC (when assuming that lack of information elements disable WaitTimeForMUSIM and disableExtendedWaitTimeForMUSIM in the RRC Reject message is taken/understood as indication or instruction that no applicability checking is to be performed), or this associating/forwarding may be effected as a result of applicability checking at USIM-A RRC (when assuming that lack of information elements disable WaitTimeForMUSIM and disableExtendedWaitTimeForMUSIM in the RRC Reject message is taken/understood as an applicability designation that waitTime and extendedWaitTime are enabled/applicable for other USIMs, including USIM-B). Upon such associating/forwarding, USIM-B RRC starts the timer T302 specific for USIM-B with waitTime, and associates/forwards extendedWaitTime with/to the upper layers of USIM-B (e.g. if USIM-B supports delay tolerant access (since extendedWaitTime need not be associated/forwarded to that upper layers of an USIM not supporting delay tolerant access)).

In the above description, examples are given assuming that the connection request inhibition time information, e.g. waitTime and/or extendedWaitTime, is obtained by being obtained (included) in an RRC message from a communication network control element or function, which is sent in response to failure of the initial connection request.

These examples are however only illustrative, while embodiments of the present disclosure are not limited thereto. Namely, the connection request inhibition time information, e.g. waitTime and/or extendedWaitTime, may be obtained by being derived at the first and/second USIM under a predefined condition. On the one hand, the connection request inhibition time information may be derived at the connection control (e.g. RRC) instance of the first USIM under a predefined condition, such as after a predefined number of connection rejections, and at least part of the derived connection request inhibition time may then be associated/forwarded with/to the connection control (e.g. RRC) instance of the second USIM. On the other hand, additionally or alternatively, the connection request inhibition time information may be derived at the connection control (e.g. RRC) instance of the second USIM under a predefined condition, such as upon an indication from the connection control (e.g. RRC) instance of the first USIM, and at least part of the derived connection request inhibition time may be applied at the connection control (e.g. RRC) instance of the second USIM.

Accordingly, there may not be an individual connection request inhibition time information, e.g. waitTime and/or extendedWaitTime, in response to a connection rejection or connection establishment failure, which is immediately used, i.e. applied at the connection control instance (e.g. the RRC instance) of the first USIM and/or associated/forwarded with/to and applied at the connection control instance (e.g. the RRC instance) of the second USIM. Rather, the obtained connection request inhibition time information does not to be individual but could be a default information, e.g. default waitTime and/or default extendedWaitTime, and does not need to be provided and/or used upon each connection rejection or connection establishment failure. For example, a default waitTime may be defined by standard (e.g. 3GPP specification) and may be used based on some (e.g. RRC) operations/actions, by which the predefined condition is defined. In one non-limiting example, after a predetermined number of connection rejections or connection establishment failures by the first USIM, the first USIM may apply default waitTime so as to inhibit the connection establishment for a standard-defined timer value, and/or the first USIM may share default waitTime with the second USIM (i.e. associate/forward default waitTime for application to/at the second USIM). In another non-limiting example, after a predetermined number of connection rejections or connection establishment failures by the first USIM, the first USIM may give a corresponding indication to the second USIM, and thereupon the second USIM may apply default waitTime so as to inhibit the connection establishment for a standard-defined timer value. Accordingly, the connection request inhibition time information does not need to be sent from a communication network control element or function every time, but the communication element or function may be pre-configured (e.g. by standard/specification) accordingly and the thus pre-configured connection request inhibition time information may be used (i.e. derived such as acquired from memory, and applied and/or associated/forwarded), as appropriate.

By virtue of exemplifying embodiments of the present disclosure, as evident from the above, efficient connection control for MUSIM devices, facilitating reduction in signaling for connection control (e.g. RRC signaling load), can be enabled/realized.

As explained above, the present disclosure provides for an improvement or optimization, which is particularly beneficial in a scenario in which multiple USIMs of a MUSIM device are camped on the same cell, in that another USIM can be prevented from initiating a connection request/establishment when a connection request/establishment rejection with connection request inhibition time information is obtained or captured/received for one USIM. Specifically, the connection request inhibition time information is obtained or captured/received for the one USIM can be re-/used for connection request inhibition for the other USIM. That is, the present disclosure provides for coordination between multiple USIMs of a MUSIM device, i.e. their connection control instances, in terms of connection control, such as e.g. RRC connection establishment. Such coordination is accomplished via an interface multiple USIMs of a MUSIM device, i.e. their connection control instances, which could also be used for sharing other (co-ordination-related) information, such as information relating to cell selection/reselection (e.g. enabling/realizing that the cell selection and reselection of a secondary USIM could follow the cell selection and reselection of a primary USIM).

Accordingly, the present disclosure is effective/helpful in mitigating signaling overload issues i.e. reducing signaling for connection control (e.g. RRC signaling load). For example, lesser RRC signaling load (e.g. in cell overload conditions) can be achieved by associating/forwarding with/to and applying at/by to another USIM, i.e. its RRC instance, an RRC waitTime parameter, and lesser RRC signaling load for delay tolerant access (e.g. in cell overload conditions) can be achieved by associating/forwarding with/to and applying at/by to another USIM, i.e. its RRC instance, an RRC extendedWaitTime parameter.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIGS. 8 and 9, while for the sake of brevity reference is made to the detailed description of respective corresponding configurations/setups, schemes, processes, sequences, methods as well as functionalities, principles and operations according to FIGS. 1 to 7.

Figure 8:
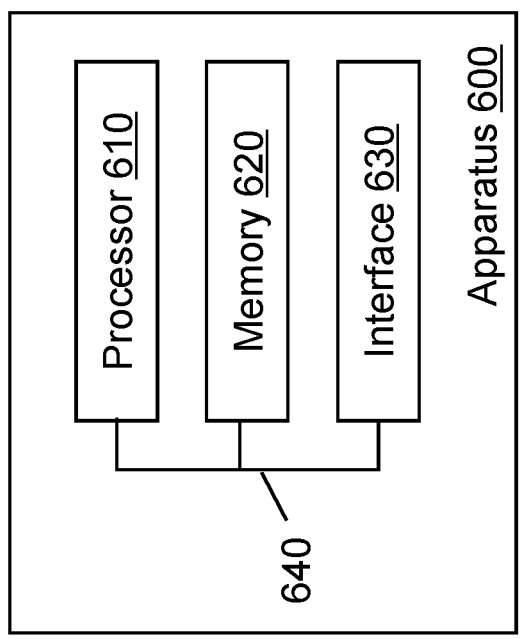
FIG. 8 shows a schematic diagram illustrating an example of a (constructional) structure of an apparatus according to at least one exemplifying embodiment.
Figure 9:
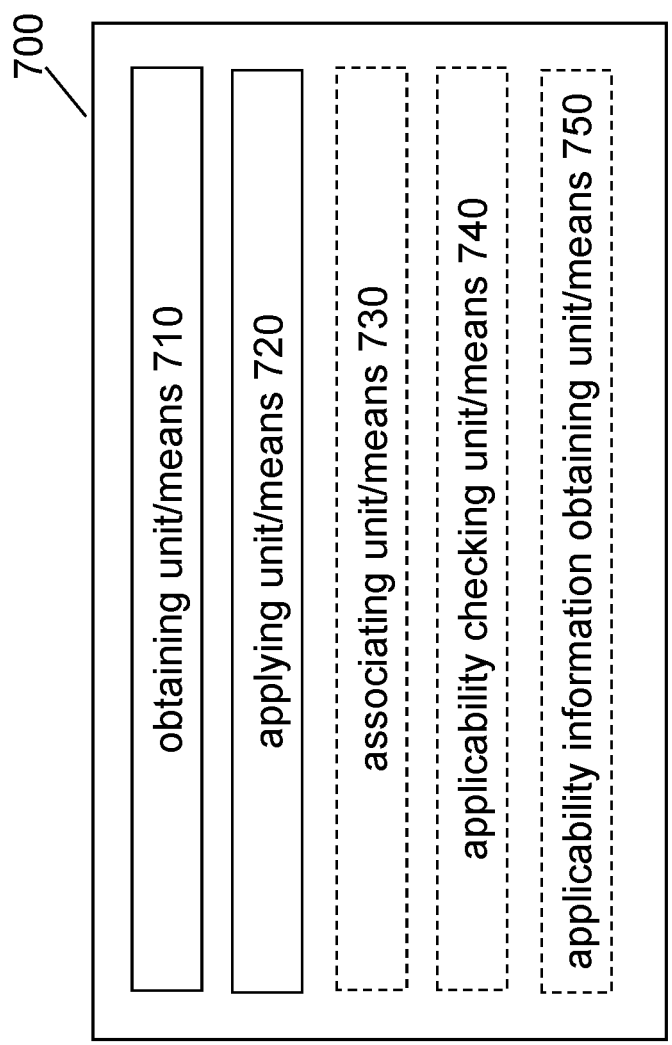
FIG. 9 shows a schematic diagram illustrating an example of a (functional) structure of an apparatus according to at least one exemplifying embodiment.

In FIGS. 8 and 9, the blocks are basically configured to perform respective methods, procedures and/or functions as described above. The entirety of blocks are basically configured to perform the methods, procedures and/or functions as described above, respectively. With respect to FIGS. 8 and 9, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 8 and 9, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 8 shows a schematic diagram illustrating an example of a (constructional) structure of an apparatus according to at least one exemplifying embodiment. Herein, an apparatus can represent a physical entity, i.e. a structural device implementing a specific network element, entity or function or the functionality thereof as such.

As indicated in FIG. 8, according to at least one exemplifying embodiment, an apparatus 600 may comprise at least one processor 610 and at least one memory 620 (and possibly also at least one interface 630), which may be operationally connected or coupled, for example by a bus 640 or the like, respectively.

The processor 610 and/or the interface 630 of the apparatus 600 may also include a modem or the like to facilitate communication over a (hardwire or wireless) link, respectively. The interface 630 of the apparatus 600 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 630 of the apparatus 600 is generally configured to communicate with at least one other apparatus, device, node or entity (in particular, the interface thereof).

The memory 620 of the apparatus 600 may represent a (non-transitory/tangible) storage medium (e.g. RAM, ROM, EPROM, EEPROM, etc.) and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 520 of the apparatus 500 may (comprise a database to) store any data, information, or the like, which is used in the operation of the apparatus.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 600 is suitable for use in practicing one or more of the exemplifying embodiments, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function. It should be appreciated that herein processors, or more generally processing portions, should not be only considered to represent physical portions of one or more processors, but may also be considered as a logical division of the referred processing tasks performed by one or more processors.

According to at least one exemplifying embodiment, the thus illustrated apparatus 600 may represent or realize/embody a (part of a) MUSIM device, i.e. a communication element or function involving multiple universal subscriber identity modules. Hence, the apparatus 600 may be configured to perform a procedure and/or exhibit a functionality and/or implement a mechanism, as described (for a MUSIM device or its instances) in any one of FIGS. 1 to 7.

Accordingly, the apparatus 600 may be caused or the apparatus 600 or its at least one processor 610 (possibly together with computer program code stored in its at least one memory 620), in its most basic form, is configured to obtain a connection rejection and a connection request inhibition time information in response to a connection request for a first USIM, and apply at least part of the connection request inhibition time information for a second USIM for inhibiting a connection request for the second USIM.

As mentioned above, an apparatus according to at least one exemplifying embodiment may be structured by comprising respective units or means for performing corresponding operations, procedures and/or functions. For example, such units or means may be implemented/realized on the basis of an apparatus structure, as exemplified in FIG. 8, i.e. by one or more processors 610, one or more memories 620, one or more interfaces 630, or any combination thereof.

FIG. 9 shows a schematic diagram illustrating an example of a (functional) structure of an apparatus according to at least one exemplifying embodiment.

As shown in FIG. 9, an apparatus 700 according to at least one exemplifying embodiment may represent or realize/embody a (part of a) MUSIM device, i.e. a communication element or function involving multiple universal subscriber identity modules. Hence, the apparatus 600 may be configured to perform a procedure and/or exhibit a functionality and/or implement a mechanism, as described (for a MUSIM device or its instances) in any one of FIGS. 1 to 7.

Such apparatus may comprise (at least) a unit or means (denoted as obtaining means 710) for obtaining a connection rejection and a connection request inhibition time information in response to a connection request for a first USIM, and a unit or means (denoted as applying means 720) for applying at least part of the connection request inhibition time information for a second USIM for inhibiting a connection request for the second USIM.

As indicated in FIG. 9 by way of a dashed-line box, such apparatus may optionally also comprise (at least) a unit or means (denoted as associating unit/means 730) for associating at least part of the connection request inhibition time information, which is obtained for the first USIM, with the second USIM. For example, the associating unit/means 730 may be configured to associate/forward at least part of the connection request inhibition time information, which is obtained at or by a connection control instance of the first USIM, with/to a connection control instance of the USIM.

According to various exemplifying embodiments as described above, the obtaining unit/means 710 and the associating unit/means 730 may refer to or be realized in/for/at the first USIM, and the applying unit/means 720 may refer to or be realized in/for/at the second USIM or both the first and second USIMs.

As indicated in FIG. 9 by way of a dashed-line box, such apparatus may optionally also comprise (at least) a unit or means (denoted as applicability checking unit/means 740) for checking applicability of the connection request inhibition time information for the second USIM on the basis of applicability information designating applicability of connection request inhibition time information for one or more USIMs, including the first and second USIMs.

According to various exemplifying embodiments as described above, the applicability checking unit/means 740 may refer to or be realized in/for/at the first USIM and/or the second USIMs. When relating to the first USIM, the associating unit/means 730 (relating to the first USIM) may be configured accordingly, namely for associating/forwarding the obtained connection request inhibition time information or part thereof, which is applicable for the second USIM, with/to the connection control instance of the second USIM. When relating to the second USIM, the applying unit/means 720 (relating to the second USIM) may be configured accordingly, namely for applying the associated/forwarded connection request inhibition time information or part thereof, which is applicable for the second USIM, at the connection control instance of the second USIM.

As indicated in FIG. 9 by way of a dashed-line box, such apparatus may optionally also comprise (at least) a unit or means (denoted as applicability information obtaining unit/means 750) for obtaining the aforementioned applicability information. According to various exemplifying embodiments as described above, the applicability information obtaining unit/means 750 may refer to or be realized in/for/at the first USIM and/or the second USIMs.

For further details regarding the operability/functionality of the apparatuses (or units/means thereof) according to exemplifying embodiments, reference is made to the above description in connection with any one of FIGS. 1 to 7, respectively.

According to exemplifying embodiments of the present disclosure, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to exemplifying embodiments of the present disclosure, a system may comprise any conceivable combination of any depicted or described apparatuses and other network elements or functional entities, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, a basic system architecture of a (tele)communication network including a mobile communication system where some examples of exemplifying embodiments are applicable may include an architecture of one or more communication networks including wireless access network sub-/system(s) and possibly core network(s). Such an architecture may include one or more communication network control elements or functions, such as e.g. access network elements, radio access network elements, access service network gateways or base transceiver stations, like a base station, an access point, a NodeB (NB), an eNB or a gNB, a distributed or a centralized unit, which controls a respective coverage area or cell(s) and with which one or more communication stations such as communication elements or functions, like user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. It should be appreciated that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of exemplifying embodiments may also be able to communicate with other networks, such as a public switched telephone network or the Internet, including the Internet-of-Things. The communication network may also be able to support the usage of cloud services for virtual network elements or functions thereof, wherein it is to be noted that the virtual network part of the (tele)communication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g. a cloud infrastructure.

Any method step is suitable to be implemented as software or by hardware without changing the idea of the present disclosure. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing efficient connection control for MUSIM devices, which are communication elements or functions involving multiple universal subscriber identity modules. Such measures exemplarily comprise obtaining a connection rejection and a connection request inhibition time information in response to a connection request for a first universal subscriber identity module, and applying at least part of the connection request inhibition time information for a second universal subscriber identity module for inhibiting (issuance of) a connection request for the second universal subscriber identity module.

Even though the present disclosure is described above with reference to the examples according to the accompanying drawings, it is to be understood that the present disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP 3rd Generation Partnership Project
4/5G 4$^{th}$/5$^{th}$ Generation
eLTE evolved LTE
eNB evolved NodeB (4G/LTE/eLTE base station)
gNB Next generation NodeB (5G/NR base station)
KPI Key Performance Indicator
LTE Long Term Evolution
mMTC massive Machine Type Communications
MUSIM Multi USIM
NAS Non-Access Stratum
NR New Radio
RRC Radio Resource Control
UE User Equipment
USIM Universal Subscriber Identity Module

The invention claimed is:

1. A method, comprising:
obtaining a connection rejection and a connection request inhibition time information in response to a connection request for a first universal subscriber identity module,
applying at least part of the connection request inhibition time information for a second universal subscriber identity module for inhibiting a connection request for the second universal subscriber identity module;
checking applicability of the connection request inhibition time information for the second universal subscriber identity module on a basis of applicability information designating applicability of connection request inhibition time information for one or more universal subscriber identity modules, including the first and second universal subscriber identity modules; and
applying the connection request inhibition time information or part thereof, which is applicable for the second universal subscriber identity module, for the second universal subscriber identity module.

2. The method according to claim 1, further comprising:
applying at least part of the connection request inhibition time information for the first universal subscriber identity module for inhibiting a connection request for the first universal subscriber identity module.

3. The method according to claim 1, wherein
the connection request inhibition time information comprises a wait time, and applying the connection request inhibition time information comprises starting a timer with a timer value corresponding to the wait time and inhibiting a connection request while the timer is running, and/or
the connection request inhibition time information comprises an extended wait time, and applying the connection request inhibition time information comprises associating the extended wait time with one or more upper layers for inhibiting a connection request for a time corresponding to the extended wait time with the one or more upper layers.

4. The method according to claim 3, wherein
in applying the connection request inhibition time information for a universal subscriber identity module, the extended wait time is associated with the one or more upper layers of said universal subscriber identity module if said universal subscriber identity module supports delay tolerant access.

5. The method according to claim 1, wherein
applying the connection request inhibition time information comprises selectively using the connection request inhibition time information for at least one of a specified condition or a specified connection type.

6. The method according to claim 1, further comprising:
obtaining the applicability information designating applicability of at least part of the obtained connection request inhibition time information for one or more universal subscriber identity modules, including the first and second universal subscriber identity modules.

7. An apparatus comprising:
at least one processor; and
at least one non-transitory memory including a computer program code,
wherein the at least one memory and the computer program code are configured, with the at least one processor, to cause the apparatus to perform at least the following:
obtaining a connection rejection and a connection request inhibition time information in response to a connection request for a first universal subscriber identity module
applying at least part of the connection request inhibition time information for a second universal subscriber identity module for inhibiting a connection request for the second universal subscriber identity module;
checking applicability of the connection request inhibition time information for the second universal subscriber identity module on a basis of applicability information designating applicability of connection request inhibition time information for one or more universal subscriber identity modules, including the first and second universal subscriber identity modules; and
applying the connection request inhibition time information or part thereof, which is applicable for the second universal subscriber identity module, for the second universal subscriber identity module.

8. The apparatus according to claim 7, wherein the at least one memory and the computer program code are configured, with the at least one processor, to cause the apparatus to perform:
applying at least part of the connection request inhibition time information for the first universal subscriber identity module for inhibiting a connection request for the first universal subscriber identity module.

9. The apparatus according to claim 7, wherein:
the connection request inhibition time information comprises a wait time, and applying the connection request inhibition time information comprises starting a timer with a timer value corresponding to the wait time and inhibiting a connection request while the timer is running, and/or
the connection request inhibition time information comprises an extended wait time, and applying the connection request inhibition time information comprises associating the extended wait time with one or more upper layers for inhibiting a connection request for a time corresponding to the extended wait time with the one or more upper layers.

10. The apparatus according to claim 9, wherein, in applying the connection request inhibition time information for a universal subscriber identity module, the extended wait time is associated with the one or more upper layers of said universal subscriber identity module if said universal subscriber identity module supports delay tolerant access.

11. The apparatus according to claim 7, wherein applying the connection request inhibition time information comprises selectively using the connection request inhibition time information for at least one of a specified condition or a specified connection type.

12. The apparatus according to claim 7, wherein the at least one memory and the computer program code are configured, with the at least one processor, to cause the apparatus to perform:

obtaining the applicability information designating applicability of at least part of the obtained connection request inhibition time information for one or more universal subscriber identity modules, including the first and second universal subscriber identity modules.

13. A computer program product comprising computer program code encoded on a non-transitory medium which, when the computer program code is executed with a computer, is configured to cause the computer to carry out the method according to claim 1.

\* \* \* \* \*